(12) United States Patent
Miller (10) Patent No.: US 10,954,966 B2
(45) Date of Patent: Mar. 23, 2021

(54) BOOTSTRAP ACCUMULATOR CONTAINING INTEGRATED BYPASS VALVE

(71) Applicant: Raytheon Company, Waltham, MA (US)

(72) Inventor: Kirk A. Miller, Dallas, TX (US)

(73) Assignee: Raytheon Company, Waltham, MA (US)

( * ) Notice: Subject to any disclaimer, the term of this patent is extended or adjusted under 35 U.S.C. 154(b) by 85 days.

(21) Appl. No.: 15/792,971

(22) Filed: Oct. 25, 2017

(65) Prior Publication Data

US 2019/0120256 A1  Apr. 25, 2019

(51) Int. Cl.
*F15B 1/04* (2006.01)
*F04B 49/24* (2006.01)
(Continued)

(52) U.S. Cl.
CPC ............. *F15B 1/04* (2013.01); *F04B 11/0025* (2013.01); *F04B 23/02* (2013.01); *F04B 49/24* (2013.01);
(Continued)

(58) Field of Classification Search
CPC .............. F04B 11/0008; F04B 11/0016; F04B 11/0025; F04B 49/035; F15B 1/021;
(Continued)

(56) References Cited

U.S. PATENT DOCUMENTS 121,482 A * 12/1871 Baldwin ................. E21B 34/10
138/31

1,213,780 A * 1/1917 Skinner ................. E21D 15/585
417/225
(Continued)

FOREIGN PATENT DOCUMENTS

EP    2792887 A1    10/2014
FR    1248917 A  * 12/1960  ............... F15B 3/00
(Continued)

OTHER PUBLICATIONS

International Search Report and Written Opinion of the International Searching Authority in connection with International Patent Application No. PCT/US2018/033684 dated Dec. 13, 2018, 9 pages.

(Continued)

*Primary Examiner* — Robert K Arundale
*Assistant Examiner* — Richard K. Durden (57) ABSTRACT

An apparatus includes a bootstrap accumulator having multiple fluid expansion volumes each configured to receive fluid. The bootstrap accumulator also includes a piston assembly configured to move within the fluid expansion volumes based on pressures within the fluid expansion volumes. The piston assembly includes (i) a fluid pathway that couples the fluid expansion volumes and (ii) a bypass valve configured to selectively open or block the fluid pathway. The piston assembly could also include multiple pistons and a connecting rod coupling the pistons. The fluid pathway could include a narrower path through a first portion of the connecting rod and a wider path through a second portion of the connecting rod. The bypass valve could include a ball and a spring configured to push the ball to block the narrower path through the first portion of the connecting rod.

20 Claims, 8 Drawing Sheets

(51) Int. Cl.
*G05D 16/10* (2006.01)
*F04B 23/02* (2006.01)
*F15B 1/26* (2006.01)
*F04B 11/00* (2006.01)
*F16K 1/52* (2006.01)
*F16K 17/38* (2006.01)

(52) U.S. Cl.
CPC ............. *F15B 1/265* (2013.01); *G05D 16/10* (2013.01); *F04B 2205/18* (2013.01); *F15B 2201/31* (2013.01); *F15B 2201/32* (2013.01); *F15B 2201/411* (2013.01); *F16K 1/52* (2013.01); *F16K 17/383* (2013.01)

(58) Field of Classification Search
CPC .. F15B 1/025; F15B 1/027; F15B 1/04; F15B 1/24; F15B 1/265; F15B 3/00; F15B 7/10; F15B 11/28; F15B 11/2846; F15B 21/006; F15B 2201/20; F15B 2201/21; F15B 2201/31; F15B 2201/32; F15B 2201/411; F15B 2201/515
USPC ................................................ 91/401; 138/31
See application file for complete search history.

(56) References Cited

U.S. PATENT DOCUMENTS

| | | | | |
|---|---|---|---|---|
| 1,905,133 A * | 4/1933 | Bishop | ................... | B23Q 5/268 138/31 |
| 1,994,747 A * | 3/1935 | Bishop | ...................... | F15B 1/02 137/115.01 |
| 2,764,999 A * | 10/1956 | Stanbury | ................... | F15B 1/24 138/31 |
| 2,830,609 A * | 4/1958 | Korsak | ................... | F15B 1/265 137/171 |
| 2,891,564 A * | 6/1959 | Jeromson, Jr. | ........... | F15B 1/027 138/31 |
| 3,015,345 A | 1/1962 | Michael | | |
| 3,094,317 A | 6/1963 | Axthammer | | |
| 3,230,977 A | 1/1966 | Mercier | | |
| 3,333,425 A * | 8/1967 | Hemard | ................ | E21D 15/585 405/293 |
| 3,669,151 A | 6/1972 | Fleming | | |
| 4,041,990 A | 8/1977 | Tang et al. | | |
| 4,067,381 A * | 1/1978 | Lord | ........................ | F01P 11/18 123/41.15 |
| 4,154,059 A | 5/1979 | Bach et al. | | |
| 4,207,563 A | 6/1980 | Soupal | | |
| 4,314,797 A | 2/1982 | Gerwin | | |
| 4,355,280 A | 10/1982 | Duzich | | |
| 4,413,953 A | 11/1983 | Fales | | |
| 4,450,870 A * | 5/1984 | Vick | ........................ | F15B 1/04 138/31 |
| 4,538,972 A | 9/1985 | Gooden | | |
| 4,691,739 A * | 9/1987 | Gooden | ............. | H05K 7/20272 138/31 |
| 4,736,879 A * | 4/1988 | Yamada | .................. | B25C 1/041 227/130 |
| 5,365,736 A * | 11/1994 | Yamamoto | ................ | F15B 1/24 137/533.11 |
| 5,897,095 A * | 4/1999 | Hickey | ................... | E21B 34/10 138/31 |
| 5,897,305 A | 4/1999 | Roddis | | |
| 6,024,114 A | 2/2000 | Thomas et al. | | |
| 6,332,477 B1 | 12/2001 | Scholl et al. | | |
| 6,644,354 B2 | 11/2003 | Dinkel et al. | | |
| 6,923,215 B2 | 8/2005 | Weber | | |
| 2010/0170760 A1 | 7/2010 | Marking | | |
| 2013/0037119 A1 | 2/2013 | Doughty | | |
| 2014/0216023 A1 | 8/2014 | Rabhi | | |
| 2016/0090997 A1 | 3/2016 | Johnson | | |
| 2017/0001293 A1 | 1/2017 | Matsuda et al. | | |

FOREIGN PATENT DOCUMENTS

| | | |
|---|---|---|
| GB | 797296 A | 7/1958 |
| JP | 5530193 B2 | 6/2014 |

OTHER PUBLICATIONS

Examination Report in connection with GCC Patent Application No. 2018-35917 dated Jan. 30, 2020, 3 pages.

Examination Report dated Nov. 29, 2020 in connection with counterpart GCC Patent Application No. GC 2018-35917, 5 pages.

* cited by examiner

BOOTSTRAP ACCUMULATOR CONTAINING INTEGRATED BYPASS VALVE

GOVERNMENT RIGHTS

This invention was made with U.S. government support under a confidential government contract (contract number withheld) awarded by the U.S. Department of Defense. The government has certain rights in the invention.

TECHNICAL FIELD

This disclosure generally relates to bootstrap accumulators. More specifically, this disclosure relates to a bootstrap accumulator containing an integrated bypass valve.

BACKGROUND

The pressure at an input of a pump often needs to be at or above a minimum threshold value in order for the pump to function properly or efficiently. For example, at input pressures below the minimum threshold, the pump could experience cavitation, which reduces the operating capacity of the pump. This can be particularly problematic in closed systems, where fluid being pumped is (ideally) confined in and cannot escape from the system. In closed systems, temperature variations can affect the amount of space occupied by the fluid being pumped. As a result, temperature-based pressure variations could cause the fluid provided to a pump in a closed system to drop below the pump's minimum threshold.

Bootstrap accumulators (also known as bootstrap reservoirs) can be used in various systems to compensate for pressure fluctuations. For example, a bootstrap accumulator could be coupled to high-pressure and low-pressure sides of a pump, and varying amounts of low-pressure and high-pressure fluid can enter and exit a volume within the bootstrap accumulator. Among other things, the bootstrap accumulator helps to compensate for volume changes of pumped fluid that are caused by bulk average system fluid temperature fluctuations.

SUMMARY

This disclosure provides a bootstrap accumulator containing an integrated bypass valve.

In a first embodiment, an apparatus includes a bootstrap accumulator having multiple fluid expansion volumes each configured to receive fluid. The bootstrap accumulator also includes a piston assembly configured to move within the fluid expansion volumes based on pressures within the fluid expansion volumes. The piston assembly includes (i) a fluid pathway that couples the fluid expansion volumes and (ii) a bypass valve configured to selectively open or block the fluid pathway.

In a second embodiment, a system includes a pump configured to be coupled to an input fluid line and an output fluid line. The pump is also configured to receive fluid through the input fluid line and to provide the fluid through the output fluid line. The system also includes a bootstrap accumulator configured to be coupled to the input fluid line and the output fluid line. The bootstrap accumulator includes multiple fluid expansion volumes configured to receive the fluid from different ones of the fluid lines. The bootstrap accumulator also includes a piston assembly configured to move within the fluid expansion volumes based on pressures within the fluid expansion volumes. The piston assembly includes (i) a fluid pathway that couples the fluid expansion volumes and (ii) a bypass valve configured to selectively open or block the fluid pathway.

In a third embodiment, a method includes receiving fluid in multiple fluid expansion volumes of a bootstrap accumulator. The method also includes moving a piston assembly within the fluid expansion volumes based on pressures within the fluid expansion volumes. The method further includes, in response to a pressure threshold associated with one or both of the fluid expansion volumes being met, opening a fluid pathway that couples the fluid expansion volumes using a bypass valve in the piston assembly.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 8, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, bootstrap accumulators are used in various systems to compensate for pressure fluctuations, such as pressure fluctuations caused by temperature variations. Unfortunately, closed systems that use pumped fluid often include filters to remove contaminants from the fluid, and clogging of a filter can create excessive pressures or over-current conditions in a pump, particularly in a closed system that is packaged compactly. Also, air often needs to be purged from a closed system in order to ensure proper or efficient operation of the system, particularly from a bootstrap accumulator (which could represent the largest volume without significant fluid flow in the system).

Some bootstrap accumulators can operate in conjunction with external over-pressure mechanisms, but this increases the size, weight, and cost of the overall systems. Other bootstrap accumulators can operate in conjunction with over-pressure valves but lack a mechanism to support purging. Still other bootstrap accumulators can use over-pressure mechanisms that vent to the ambient atmosphere, which means they cannot be used in closed systems.

In accordance with this disclosure, a bootstrap accumulator contains an integrated bypass valve. For example, the bootstrap accumulator includes a piston assembly that separates high-pressure and low-pressure fluid, and the piston assembly can include a bypass valve. The bypass valve selectively opens or blocks a fluid pathway between high-pressure and low-pressure sides of the bootstrap accumulator. The fluid pathway can be used for over-pressure relief, rapid air purging, or other functions.

In this way, over-pressure relief and air purging can be performed in the bootstrap accumulator without requiring the use of external components. Moreover, because the bypass valve is integrated into the bootstrap accumulator, no additional plumbing or volume is needed to connect the bootstrap accumulator to an external over-pressure mechanism. These factors help to reduce the size, weight, and cost of an overall system. In addition, the bypass valve does not vent over-pressure to the ambient atmosphere, allowing the bootstrap accumulator to be used in closed systems.

Note that the terms "high" and "low" are used repeatedly in the following description to refer to different pressures, temperatures, or other values. These terms do not imply any specific values or ranges of values. Instead, these terms are used merely to distinguish between different pressures, temperatures, or other values. For example, a pressure that is high in one application could be considered low in another application, and a pressure that is low in one application could be considered high in another application. The specific values for high and low pressures, temperatures, or other values can therefore vary as needed or desired. Also, "high-pressure fluid" and "low-pressure fluid" in the following discussion can refer to the same fluid within a larger system, where the fluid has different pressures at different locations within the system.

Figure 1:
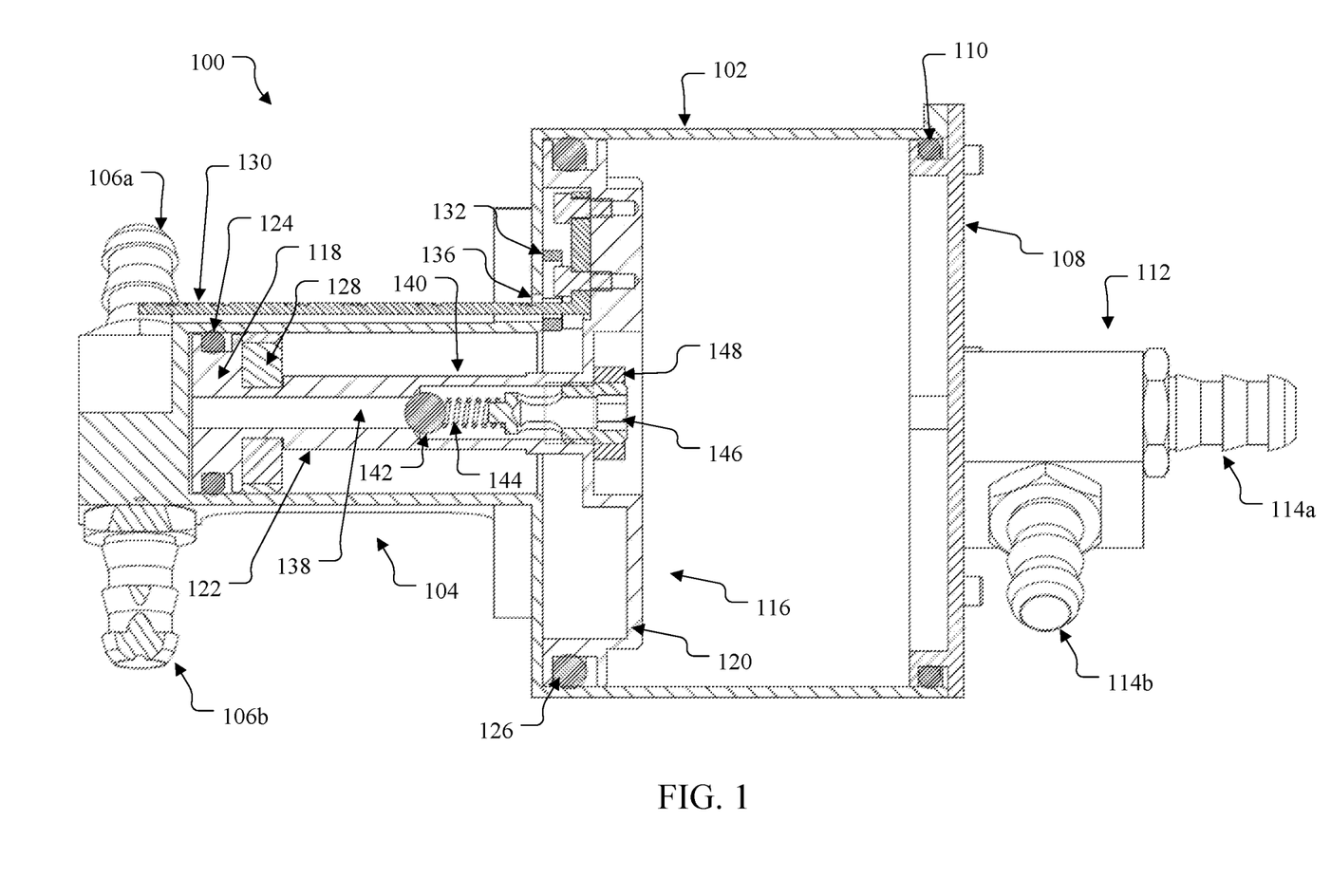
FIGS. 1 and 2 illustrate an example bootstrap accumulator containing an integrated bypass valve in accordance with this disclosure.
Figure 2:
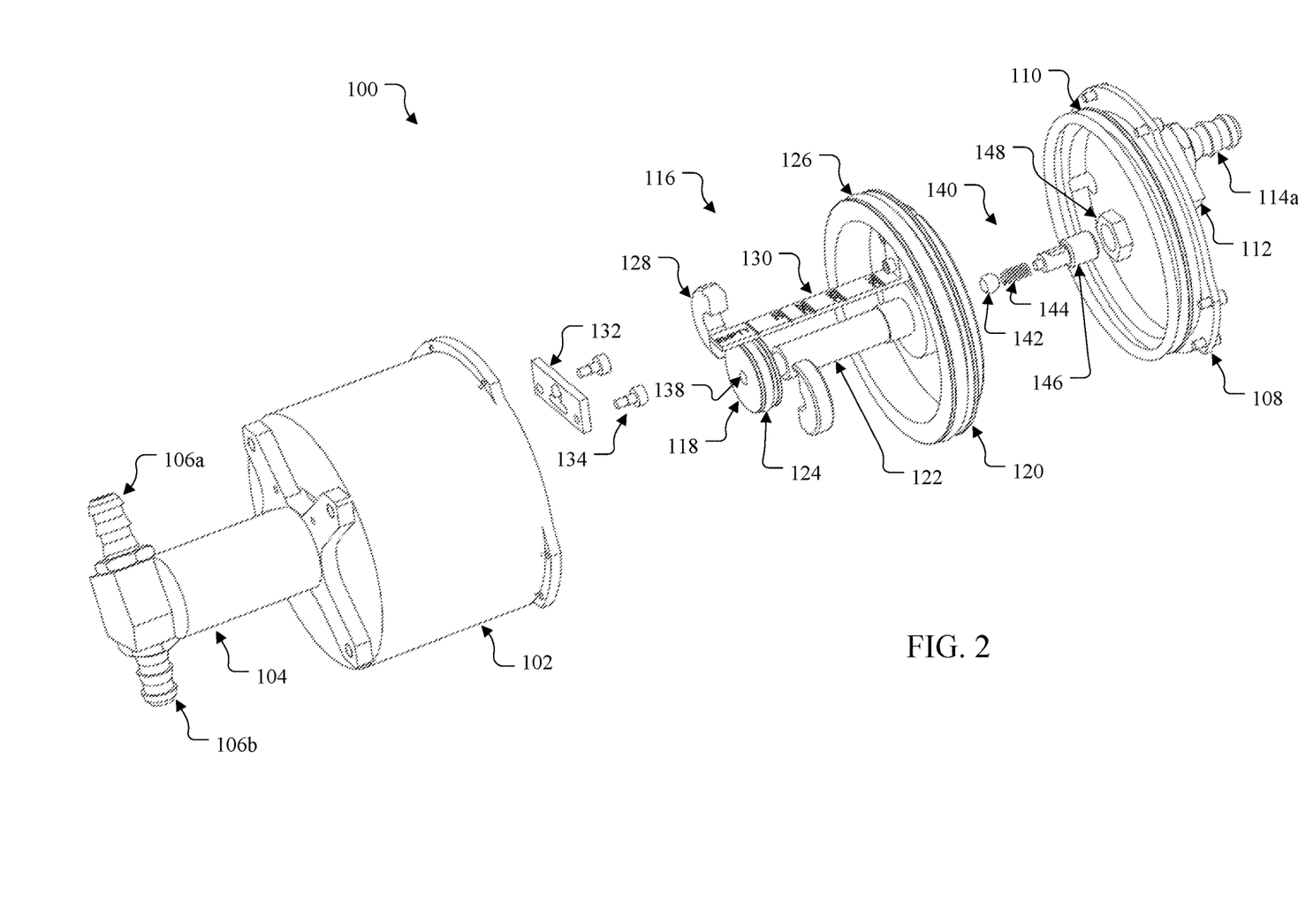

FIGS. 1 and 2 illustrate an example bootstrap accumulator 100 containing an integrated bypass valve in accordance with this disclosure. As shown in FIGS. 1 and 2, the bootstrap accumulator 100 includes a main accumulator body 102, which forms a housing in or to which other components of the bootstrap accumulator 100 are placed or attached. The body 102 also defines a fluid expansion volume inside the body 102 into which low-pressure fluid can enter and exit. The body 102 could be formed from any suitable material(s), such as one or more metals. The body 102 could also be formed in any suitable manner. In addition, while the body 102 is shown here as being generally cylindrical, the body 102 could have any suitable size, shape, and dimensions.

The bootstrap accumulator 100 also includes a high-pressure connection assembly 104 coupled to or integrated with one end of the body 102, and the connection assembly 104 is coupled to one or more fluid connectors 106a-106b. In this example, there are two fluid connectors 106a-106b, where a high-pressure fluid can pass into the connection assembly 104 through one of the fluid connectors 106a-106b and exit the connection assembly 104 through another of the fluid connectors 106a-106b. However, the high-pressure fluid could also enter and exit the connection assembly 104 through a single fluid connector. The connection assembly 104 also defines a fluid expansion volume inside the connection assembly 104 into which the high-pressure fluid can enter and exit. The high-pressure connection assembly 104 could be formed from any suitable material(s), such as one or more metals, that allow the connection assembly 104 to withstand elevated fluid pressures. The connection assembly 104 could also be formed in any suitable manner. In addition, while the connection assembly 104 is shown here as being generally cylindrical, the connection assembly 104 could have any suitable size, shape, and dimensions. Note that the connection assembly 104 could also be formed integral with the body 102. Each of the fluid connectors 106a-106b includes any suitable structure for coupling to a tube, pipe, or other structure transporting a fluid.

The bootstrap accumulator 100 further includes a cover 108 coupled to another end of the body 102. The cover 108 allows other components of the bootstrap accumulator 100 to be inserted into the interior of the bootstrap accumulator 100. The cover 108 could be formed from any suitable material(s), such as one or more metals.

The cover 108 could also be formed in any suitable manner. In addition, while the cover 108 is shown here as being generally circular, the cover 108 could have any suitable size, shape, and dimensions to generally match that of the body 102. A seal 110 can be used to prevent leakage of fluid around the cover 108 and out of the body 102. The seal 110 includes any suitable structure for preventing fluid leakage, such as a rubber or other O-ring material(s). Note that while the seal 110 is shown here as having a circular cross-section, the seal 110 could have any other suitable cross-sectional shape, such as a square, rectangular, or other polygonal shape.

The bootstrap accumulator 100 also includes a low-pressure connection assembly 112 coupled to or integrated with the cover 108, and the connection assembly 112 is coupled to one or more fluid connectors 114a-114b. In this example, there are two fluid connectors 114a-114b, where a low-pressure fluid can pass into the connection assembly 112 through one of the fluid connectors 114a-114b and exit the connection assembly 112 through another of the fluid connectors 114a-114b. However, the low-pressure fluid could also enter and exit the connection assembly 112 through a single fluid connector. The low-pressure connection assembly 112 is also fluidly connected to the body 102 so that the low-pressure fluid can enter into and exit the fluid expansion volume defined within the body 102. The low-pressure connection assembly 112 could be formed from any suitable material(s), such as one or more metals. The connection assembly 112 could also be formed in any suitable manner. In addition, while the connection assembly 112 is shown here as being generally polygonal, the connection assembly 112 could have any suitable size, shape, and dimensions. Note that the connection assembly 112 could also be formed integral with the cover 108. Each of the fluid connectors 114a-114b includes any suitable structure for coupling to a tube, pipe, or other structure transporting a fluid.

A piston assembly 116 is positioned within the bootstrap accumulator 100 and moves back and forth within the fluid expansion volumes of the body 102 and the high-pressure connection assembly 104 during operation. The piston assembly 116 includes a high-pressure piston 118, a low-pressure piston 120, and a connecting rod 122. The high-pressure piston 118 fits inside and moves within the high-pressure connection assembly 104, and the low-pressure piston 120 fits inside and moves within the body 102. The pistons 118 and 120 can therefore vary the amounts of the fluid expansion volumes within the bootstrap accumulator 100 that are occupied by the high-pressure fluid and the low-pressure fluid, respectively.

Each piston 118 and 120 includes any suitable structure configured to move within a body or other component of a bootstrap accumulator. Each piston 118 and 120 could also be formed from any suitable material(s), such as one or more metals, and in any suitable manner. Note that while each piston 118 and 120 is shown here as being generally circular, each piston 118 and 120 could have any suitable size, shape, and dimensions. Seals 124 and 126 can be used to prevent leakage of fluid around the pistons 118 and 120, respectively, and out of the bootstrap accumulator 100. Each seal 124 and 126 includes any suitable structure for preventing fluid leakage, such as a rubber or other O-ring material(s). Note that while each seal 124 and 126 is shown here as having a circular cross-section, each seal 124 and 126 could have any other suitable cross-sectional shape, such as a square, rectangular, or other polygonal shape.

The connecting rod 122 connects the pistons 118 and 120 so that the pistons move in unison. When the piston 118 moves inward (left to right in FIG. 1), the piston 120 moves outward, enlarging the space for the high-pressure fluid and reducing the space for the low-pressure fluid within the bootstrap accumulator 100. Conversely, when the piston 120 moves inward (right to left in FIG. 1), the piston 118 moves outward, enlarging the space for the low-pressure fluid and reducing the space for the high-pressure fluid within the bootstrap accumulator 100. The connecting rod 122 could be formed from any suitable material(s), such as one or more metals, and in any suitable manner. While the connecting rod 122 is shown here as being generally cylindrical, the connecting rod 122 could have any suitable size, shape, and dimensions.

Because the connecting rod 122 couples the pistons 118 and 120, the surface areas of the pistons 118 and 120 affect how the piston assembly 116 moves in response to pressure. The high-pressure piston 118 is smaller, and the low-pressure piston 120 is larger. This allows a smaller amount of the high-pressure fluid to apply an equal amount of force against the high-pressure piston 118 as a larger amount of the low-pressure fluid against the low-pressure piston 120. The surface areas of the pistons 118 and 120 could therefore be selected to provide desired functionality in the bootstrap accumulator 100. In some embodiments, the high-pressure piston 118 is sized as small as possible to maximize fluid expansion capacity while still providing satisfactory pressure amplification over atmospheric ambient pressure to a pump's inlet.

The piston assembly 116 in this example also includes a piston wear guide 128. The guide 128 fits around the connecting rod 122, such as within a notch at or near the end of the connecting rod 122. The guide 128 moves with the high-pressure piston 118 and the connecting rod 122 to help reduce or prevent contact of the high-pressure piston 118 with the inner walls of the high-pressure connection assembly 104. This can reduce or prevent the formation of debris and the occurrence of wear that can degrade seal effectiveness and lead to leaks. The guide 128 could be formed from any suitable softer material(s), such as one or more plastics, and in any suitable manner. While the guide 128 is shown here as being generally cylindrical, the guide 128 could have any suitable size, shape, and dimensions. Also, while the guide 128 is shown here as being constructed of two interconnecting parts, the guide 128 could be fabricated or formed in any other suitable manner.

The piston assembly 116 in this example further includes a fill gauge 130, which is attached to the low-pressure piston 120 and extends through the body 102. An exposed portion of the fill gauge 130 is therefore visible outside of the bootstrap accumulator 100 and provides a visual indication of the position of the low-pressure piston 120 within the body 102. This allows operations, maintenance, or other personnel to identify the state of the bootstrap accumulator 100, such as whether the bootstrap accumulator 100 currently has more high-pressure or low-pressure fluid within the fluid expansion volume of the body 102. The fill gauge 130 could be marked with different values, tick marks, or other indicators of the system's bulk average temperature (which refers to the average temperature of the fluid contained in the system). The fill gauge 130 could be formed from any suitable material(s), such as one or more metals, and in any suitable manner.

The fill gauge 130 passes through a gauge wear guide 132. The wear guide 132 helps to reduce or prevent contact of the fill gauge 130 with the body 102. Such contact could cause debris from the fill gauge 130 to accumulate on low-pressure or high-pressure sealing surfaces, causing premature seal degradation and leakage. The guide 132 could be formed from any suitable softer material(s), such as one or more plastics, and in any suitable manner. While the guide 132 is shown here as being generally rectangular and secured using bolts or shoulder screws 134, the guide 132 could have any suitable size, shape, and dimensions and could be secured using any other suitable connectors. An opening 136 in the body 102 allows the fill gauge 130 to pass out of the body 102. The opening 136 also functions as an atmospheric vent, which helps to fill the space between the pistons 118 and 120 with ambient air at ambient pressure and allows the piston assembly 116 to move freely back and forth depending on the system's average bulk fluid temperature.

The piston assembly 116 in this example also includes a fluid pathway 138 through the high-pressure piston 118, the connecting rod 122, and the low-pressure piston 120. The fluid pathway 138 represents a path through which fluid can flow through the piston assembly 116 and between the high-pressure and low-pressure fluid expansion volumes of the bootstrap accumulator 100. The fluid pathway 138 could have any suitable size, shape, and dimensions. In this example, the fluid pathway 138 is smaller when passing through the piston 118 and one portion of the connecting rod 122, and the fluid pathway 138 widens when passing through another portion of the connecting rod 122 and the piston 120.

A bypass valve 140 is integrated into the piston assembly 116 and is used to selectively open the fluid pathway 138 during over-pressure conditions and is otherwise used to close the fluid pathway 138. For instance, the bypass valve 140 could be placed into the larger portion of the fluid pathway 138 and could be used to block the fluid pathway 138 at the point where the fluid pathway 138 narrows. The bypass valve 140 in this example is formed using a sealing ball 142 and a sealing spring 144. The sealing spring 144 can normally push against the sealing ball 142 and block the narrower portion of the fluid pathway 138, thereby closing the fluid pathway 138 and reducing or preventing the flow of fluid through the bypass valve 140.

During over-pressure conditions or purging operations, high-pressure fluid can push against the sealing ball 142 to overcome the spring force, and the sealing spring 144 allows the sealing ball 142 to move away from the narrower portion of the fluid pathway 138. This unblocks the fluid pathway 138 and allows the high-pressure fluid to pass around the ball 142 and through the remainder of the connecting rod 122 and through the piston 120. As a result, the integrated bypass valve 140 in the piston assembly 116 allows high-pressure fluid, under certain circumstances, to pass through the piston assembly 116 between the high-pressure and low-pressure fluid expansion volumes within the bootstrap accumulator 100.

Each of the sealing ball 142 and the sealing spring 144 could be formed from any suitable material(s), such as one or more metals, and in any suitable manner. In some embodiments, the amount of pressure applied by the sealing spring 144 against the sealing ball 142 can be adjusted, which in this example is done using an adjuster screw 146 and a jam nut 148. The adjuster screw 146 includes a narrower tip for coupling to or retention of the spring 144 and a hollow body through which fluid can flow. However, other mechanisms for adjusting the amount of pressure applied by the spring 144 against the ball 142 can be used.

As described above, one use of the bootstrap accumulator 100 is helping to compensate for volume changes of a fluid caused by temperature fluctuations. For example, temperature fluctuations could cause volume changes in low-pressure fluid entering a pump and/or high-pressure fluid exiting the pump. The fluid expansion volumes inside the body 102 of the bootstrap accumulator 100 allow for expansion of fluid into the bootstrap accumulator 100 (such as during higher temperatures) and removal of fluid from the bootstrap accumulator 100 (such as during lower temperatures). The ability to compensate for volume changes in the fluid can help to reduce or prevent cavitation in the pump. Moreover, the bypass valve 140 integrated into the bootstrap accumulator 100 supports the release of over-pressure from the high-pressure fluid expansion volume of the bootstrap accumulator 100, which can be useful when a filter clogs or in other situations. Further, the bypass valve 140 integrated into the bootstrap accumulator 100 supports easy purging of air from the bootstrap accumulator 100. In addition, both over-pressure releases and air purges can occur without venting fluid to the ambient environment, allowing the bootstrap accumulator 100 to be used in closed systems.

Although FIGS. 1 and 2 illustrate one example of a bootstrap accumulator 100 containing an integrated bypass valve, various changes may be made to FIGS. 1 and 2. For example, the relative sizes, shapes, and dimensions of the components in the bootstrap accumulator 100 are for illustration only. Also, various components shown in FIGS. 1 and 2 could be fabricated as integral components or as separate components that are coupled together in any suitable manner. Further, while various mechanical mechanisms such as bolts and nuts are described above, other mechanical mechanisms that perform the same or similar functions could be used here.

FIGS. 3 through 6 illustrate example uses of a bootstrap accumulator 100 containing an integrated bypass valve 140 in accordance with this disclosure. Note that the uses shown in FIGS. 3 through 6 represent example uses of the bootstrap accumulator 100 and that the bootstrap accumulator 100 could be used in any other suitable manner.

Figure 3:
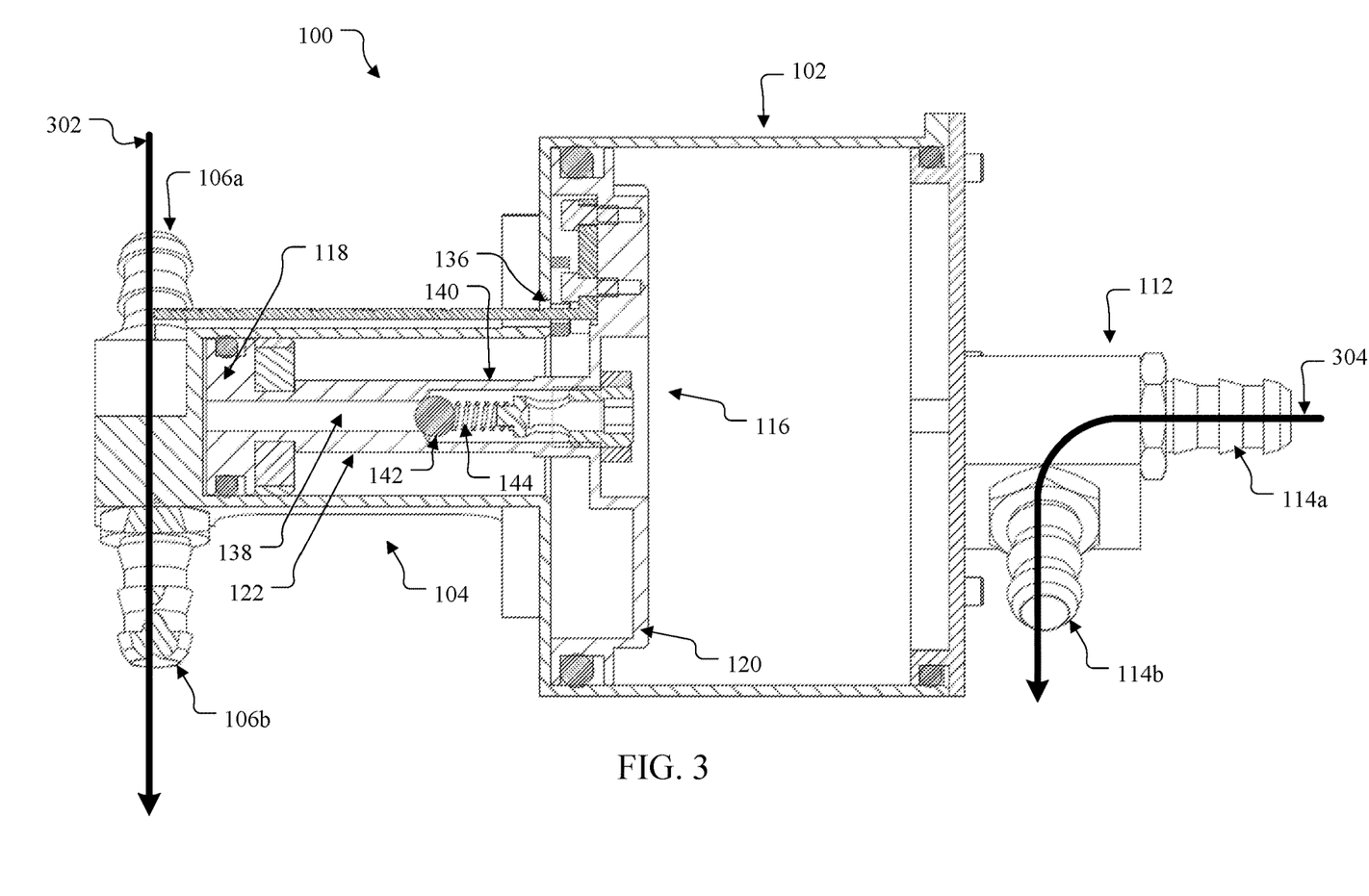
FIGS. 3 through 6 illustrate example uses of a bootstrap accumulator containing an integrated bypass valve in accordance with this disclosure.

In FIG. 3, normal operation of the bootstrap accumulator 100 at high fluid temperature is shown, where it is assumed that the low-pressure fluid traveling through the low-pressure connection assembly 112 has reached a maximum expected temperature. The maximum expected temperature could represent the highest temperature that the low-pressure fluid is expected or allowed to reach in a given application. Because the low-pressure fluid is at its maximum expected temperature, the volume occupied by the low-pressure fluid in the body 102 may also be at its maximum expected volume. As a result, the pistons 118 and 120 have been pushed to the left in FIG. 3 to the maximum extent, the fluid expansion volume inside the body 102 is essentially filled with low-pressure fluid, and the fluid expansion volume inside the high-pressure connection assembly 104 is essentially empty of high-pressure fluid. Due to the presence of the vent opening 136, the fluid expansion volume inside the connection assembly 104 is occupied primarily by ambient air. During this time, a flow 302 of high-pressure fluid generally enters the fluid connector 106a and exits the fluid connector 106b of the high-pressure connection assembly 104, and a flow 304 of low-pressure fluid generally enters the fluid connector 114a and exits the fluid connector 114b of the low-pressure connection assembly 112. The bypass valve 140 during this time is closed because of the position of the ball 142 and the compression of the spring 144 and does not permit much if any fluid flow through the fluid pathway 138.

Figure 4:
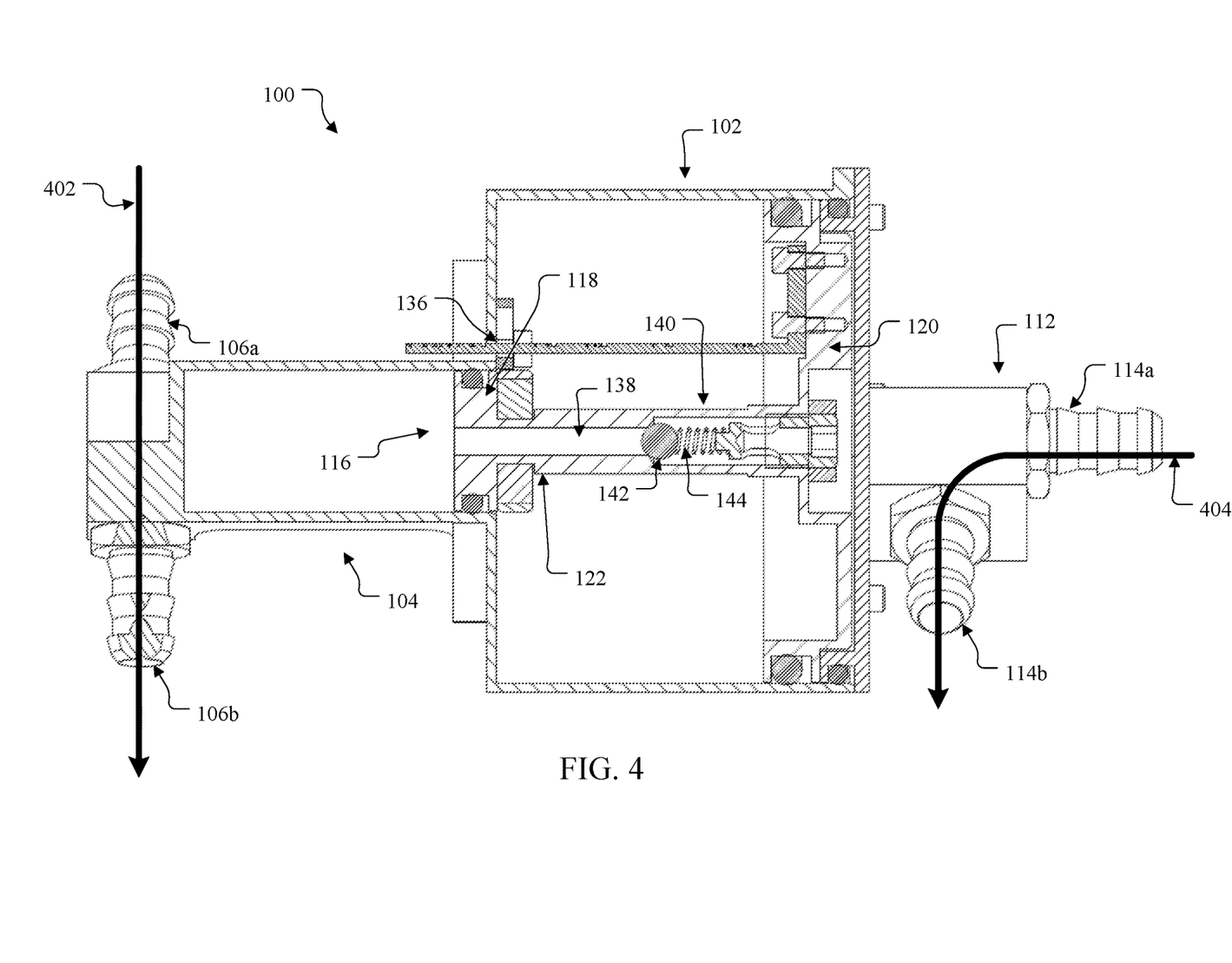

In FIG. 4, normal operation at low fluid temperature is shown, where it is assumed that the low-pressure fluid traveling through the low-pressure connection assembly 112 has reached a minimum expected temperature. The minimum expected temperature could represent the lowest temperature that the low-pressure fluid is expected or allowed to reach in a given application. Because the low-pressure fluid is at its minimum expected temperature, the volume occupied by the low-pressure fluid may also be at its minimum expected volume. As a result, the pistons 118 and 120 have been pushed to the right in FIG. 4 to the maximum extent, the fluid expansion volume inside the body 102 is essentially empty of low-pressure fluid, and the fluid expansion volume inside the high-pressure connection assembly 104 is essentially filled with high-pressure fluid. Due to the presence of the vent opening 136, the fluid expansion volume inside the body 102 is occupied primarily by ambient air. During this time, a flow 402 of high-pressure fluid generally enters the fluid connector 106a and exits the fluid connector 106b of the high-pressure connection assembly 104, and a flow 404 of low-pressure fluid generally enters the fluid connector 114a and exits the fluid connector 114b of the low-pressure connection assembly 112. The bypass valve 140 during this time is closed because of the position of the ball 142 and the compression of the spring 144 and does not permit much if any fluid flow through the fluid pathway 138. By pushing most or all of the low-pressure fluid out of the fluid expansion volume in the body 102, the bootstrap pressure on the input of a pump or other device can be maintained.

Figure 5:
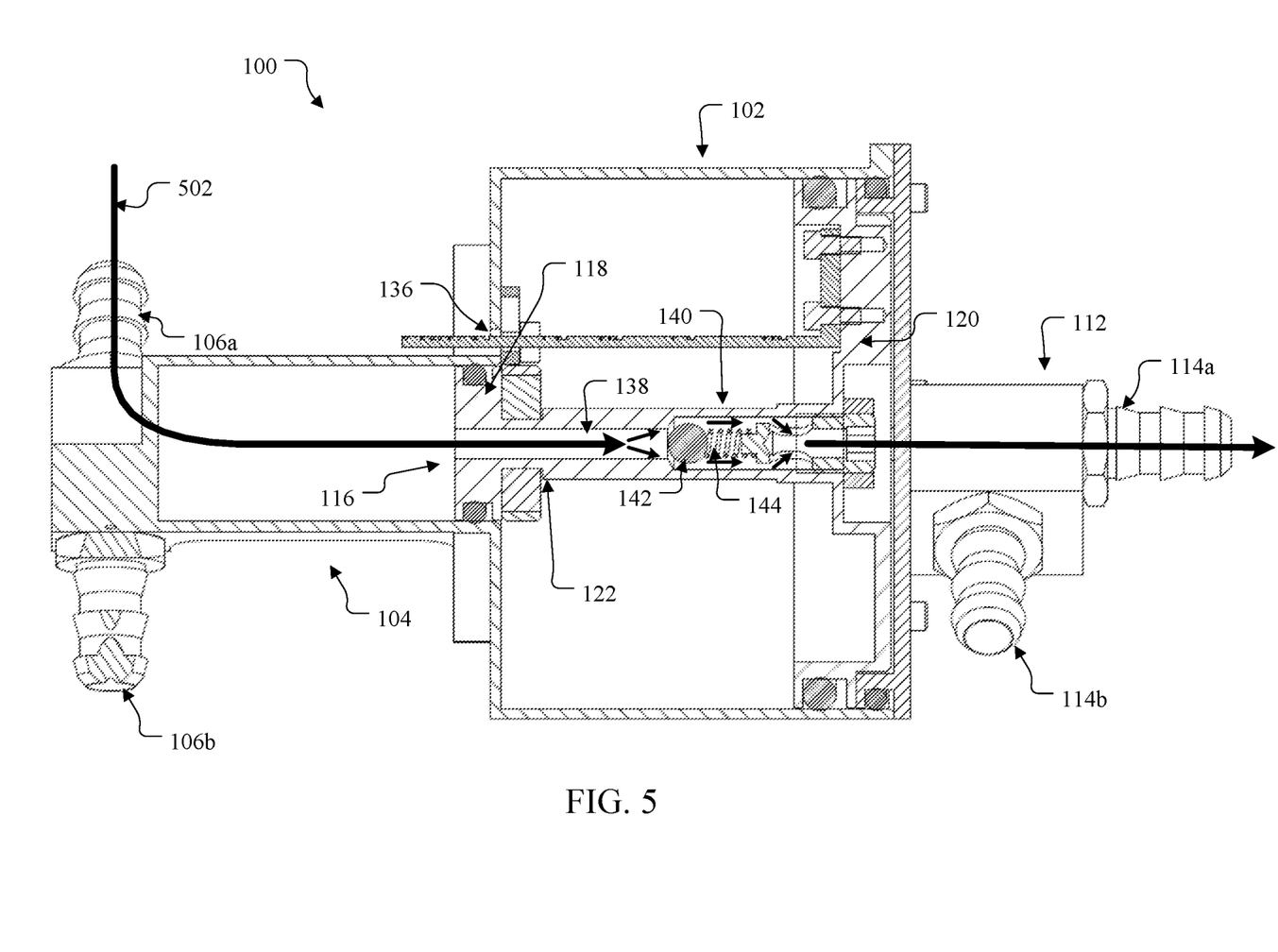

In FIG. 5, operation during a purging operation is shown, where it is assumed that the pressure on the high-pressure side of the bootstrap accumulator 100 overcomes the force provided by the sealing spring 144 and moves the sealing ball 142 away from the piston 118 and towards the piston 120. The ball 142 therefore stops blocking the narrower part of the fluid pathway 138, which opens the fluid pathway 138 and allows significant fluid flow to occur around the ball 142 and through the piston assembly 116. During this time, a flow 502 of fluid generally enters the fluid connector 106a, travels through the piston assembly 116, and exits at least one of the fluid connectors 114a-114b. The purging operation may allow, for example, air within the body 102 or other portion of the bootstrap accumulator 100 to be removed. As can be seen here, this does not involve the venting of air or fluid to the ambient environment.

Figure 6:
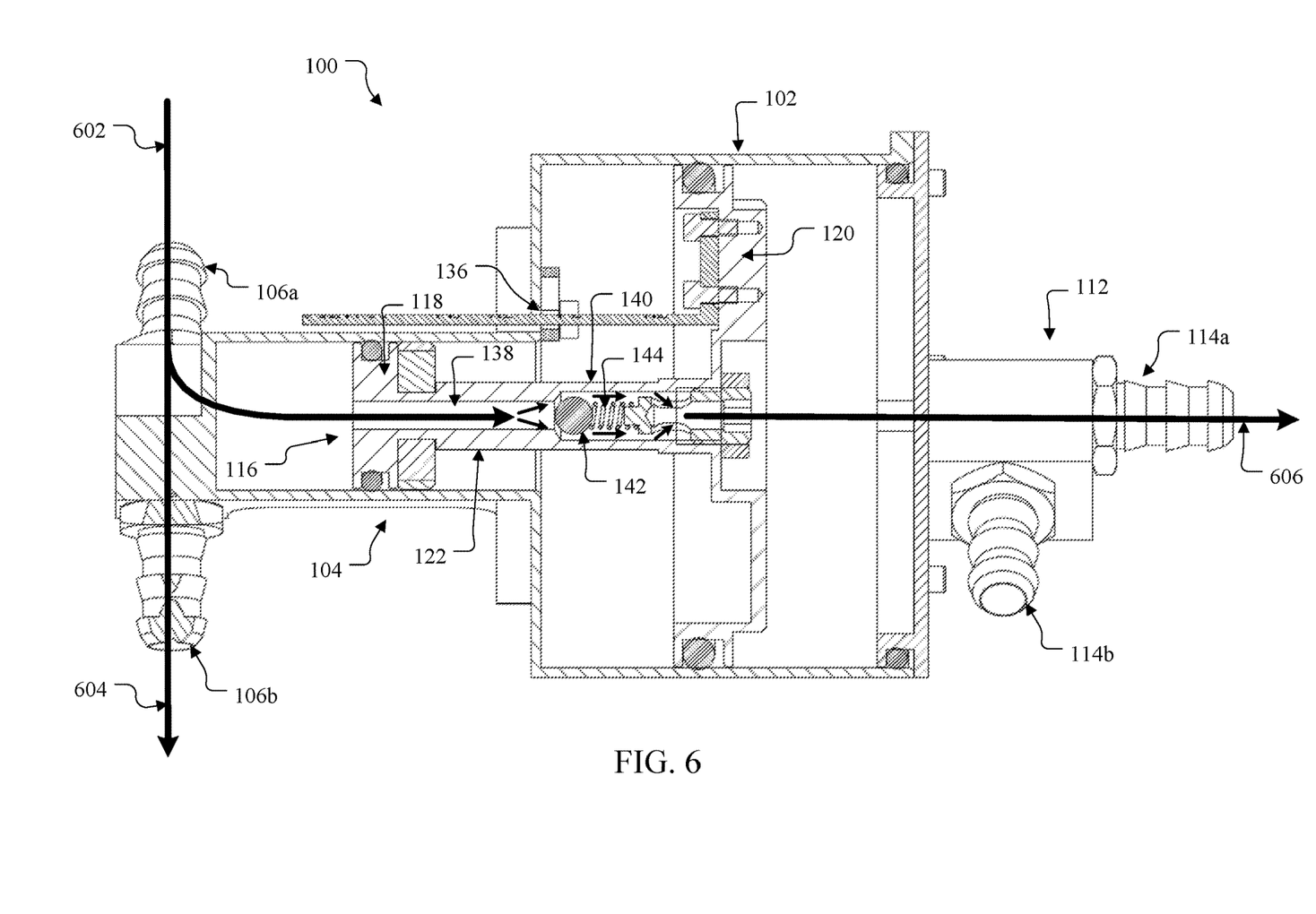

In FIG. 6, operation during an over-pressure condition is shown, where it is assumed that the flow of high-pressure fluid has been partially blocked somewhere in a larger system. This causes the pressure of the high-pressure fluid within the bootstrap accumulator 100 to increase. As a result, the bypass valve 140 allows release of part of the over-pressure through the piston assembly 116. During this time, a flow 602 of high-pressure fluid generally enters the fluid connector 106a, part of the high-pressure fluid exits the fluid connector 106b as a flow 604, and another part of the high-pressure fluid exits at least one of the fluid connectors 114a-114b as a flow 606. The bypass valve 140 here permits fluid flow through the piston assembly 116 and helps to relieve the over-pressure condition while preventing the venting of air or fluid to the ambient environment. Note that the location of the piston assembly 116 in FIG. 6 is an example only and that the piston assembly 116 could have any other location during an over-pressure condition.

Although FIGS. 3 through 6 illustrate examples of uses of a bootstrap accumulator 100 containing an integrated bypass valve 140, various changes may be made to FIGS. 3 through 6. For example, any other suitable flows of fluid could pass through the bootstrap accumulator 100 depending on the implementation, application, and current mode of operation.

Figure 7:
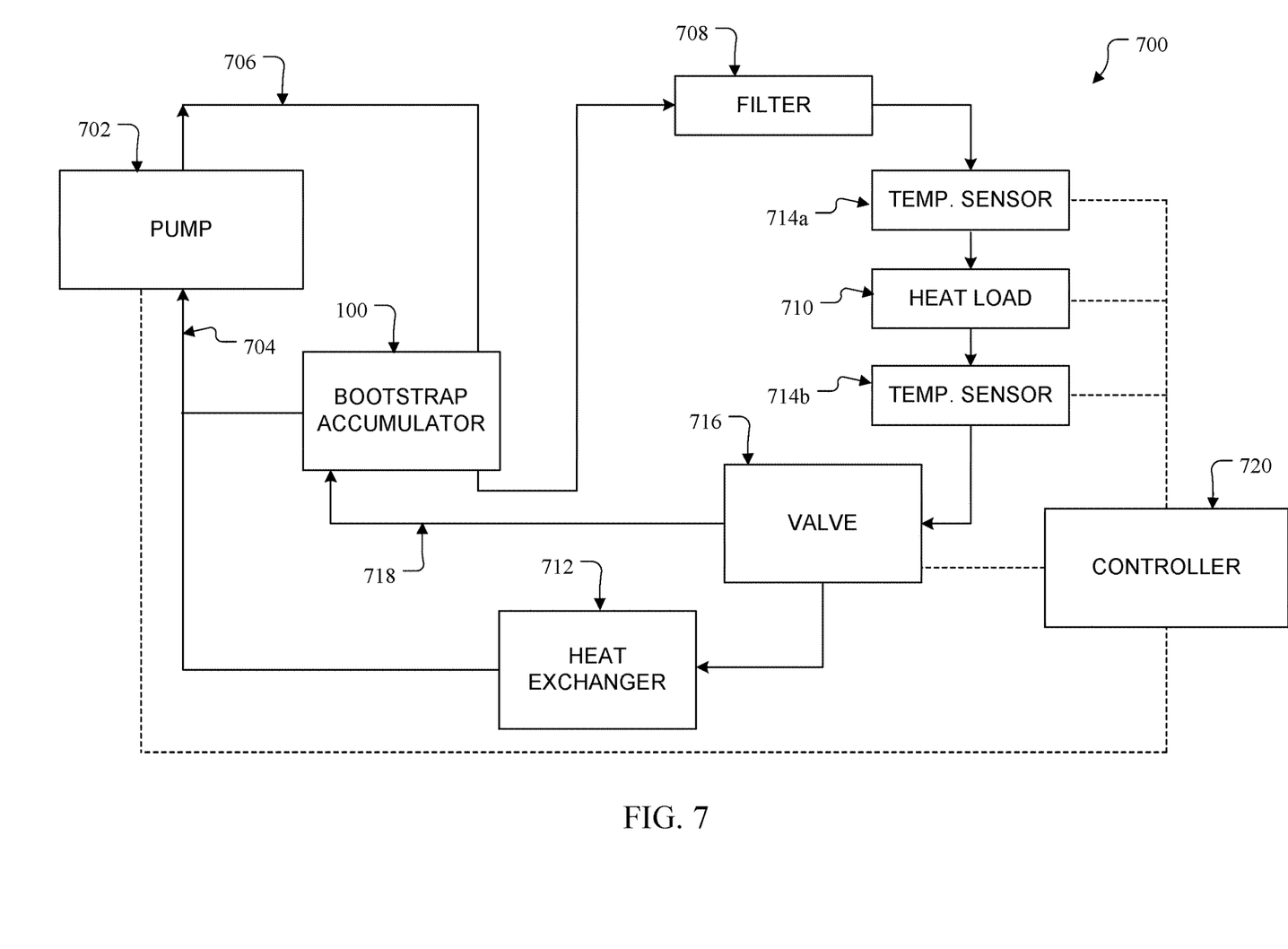
FIG. 7 illustrates an example system having a bootstrap accumulator containing an integrated bypass valve in accordance with this disclosure.

FIG. 7 illustrates an example system 700 having a bootstrap accumulator containing an integrated bypass valve in accordance with this disclosure. For ease of explanation, the system 700 is described as containing the bootstrap accumulator 100 of FIGS. 1 through 6. However, the system 700 could include any other suitable bootstrap accumulator containing an integrated bypass valve.

As shown in FIG. 7, the system 700 includes a pump 702, which is configured to receive a fluid flow through an input fluid line 704 and to output a fluid flow through an output fluid line 706. The output fluid flow in the fluid line 706 is at a higher pressure (and often times a much higher pressure) than the input fluid flow in the fluid line 704. The pump 702 includes any suitable structure for pumping fluid. Each fluid line 704 and 706 includes any suitable structure for transporting a fluid, such as a tube or pipe.

In this example, the system 700 uses the fluid being pumped as part of a cooling loop to remove heat from one or more components in the system 700. Here, the fluid from the pump 702 passes through a filter 708, which can remove contaminants or other materials from the fluid. The fluid is provided to a heat load 710, which represents any suitable source of heat being removed by the fluid. The fluid can then be provided to a heat exchanger 712, such as a fluid-to-air heat exchanger. The heat exchanger 712 removes heat from the fluid, cooling the fluid and allowing the fluid to be recirculated to the heat load 710 to remove additional heat. The cooling loop in the system 700 is therefore designed to cool the heat load 710. The filter 708 includes any suitable structure for removing contaminants or other materials from fluid. The heat exchanger 712 includes any suitable structure for removing heat from fluid.

A bootstrap accumulator 100 is coupled across the input and output fluid lines 704 and 706 of the pump 702. As noted above, the bootstrap accumulator 100 can help to compensate for temperature-based volume variations or other variations while passively increasing pump inlet pressure to the pump 702, thereby preventing cavitation or other issues. This can help to ensure proper operation or increase the efficiency or operational lifetime of the pump 702.

If needed or desired, one or more temperature sensors 714a-714b and/or a valve 716 could be used in the system 700. Each temperature sensor 714a-714b can measure the temperature of the fluid flowing in the system 700 or through components of the system 700. In this particular example, one temperature sensor 714a is located before the heat load 710, and one temperature sensor 714b is located after the heat load 710, and the temperature sensors 714a-714b can be used to estimate how much heat is being removed or could be removed from the head load 710. Note, however, that only one temperature sensor could be used at any desired location or multiple temperature sensors could be used at any desired locations in the system 700. Each temperature sensor 714a-714b includes any suitable structure configured to measure temperature.

The valve 716 allows varying amounts of fluid to flow to the heat exchanger 712 or the bootstrap accumulator 100. For example, during periods when little or no heat is being removed by the fluid from the heat load 710, there may be no need for the fluid to flow through the heat exchanger 712 before being provided to the pump 702. In that case, the valve 716 could direct most or all of the fluid from the heat load 710 through a bypass fluid line 718 to the bootstrap accumulator 100. During periods when much heat is being removed from the heat load 710, the valve 716 could direct most or all of the fluid from the heat load 710 through the heat exchanger 712. The valve 716 includes any suitable structure for selectively directing fluid.

A controller 720 could be used in the system 700 to control the operations of various components in the system 700. For example, the controller 720 could monitor the pump flow rate and the pressure differential of the pump 702, such as by using commutation as an indicator of the flow rate and by using electrical drive current as an indicator of the pressure differential. The controller 720 could also use measurements from one or more temperature sensors 714a-714b to determine how to control the valve 716. The controller 720 could further control the operation of the heat load 710, such as by reducing or preventing operation of the heat load 710 if the heat exchanger 712 cannot remove adequate heat from the fluid. The controller 720 could perform any other or additional control operations in the system 700. The controller 720 includes any suitable control or computing device. For instance, the controller 720 can represent one or more microprocessors, microcontrollers, digital signal processors, field programmable gate arrays, application specific integrated circuits, or discrete circuitry.

Although FIG. 7 illustrates one example of a system 700 having a bootstrap accumulator containing an integrated bypass valve, various changes may be made to FIG. 7. For example, the bootstrap accumulator 100 could be used with a pump or other device in any other suitable system and need not be used with the specific combination of components shown in FIG. 7.

Figure 8:
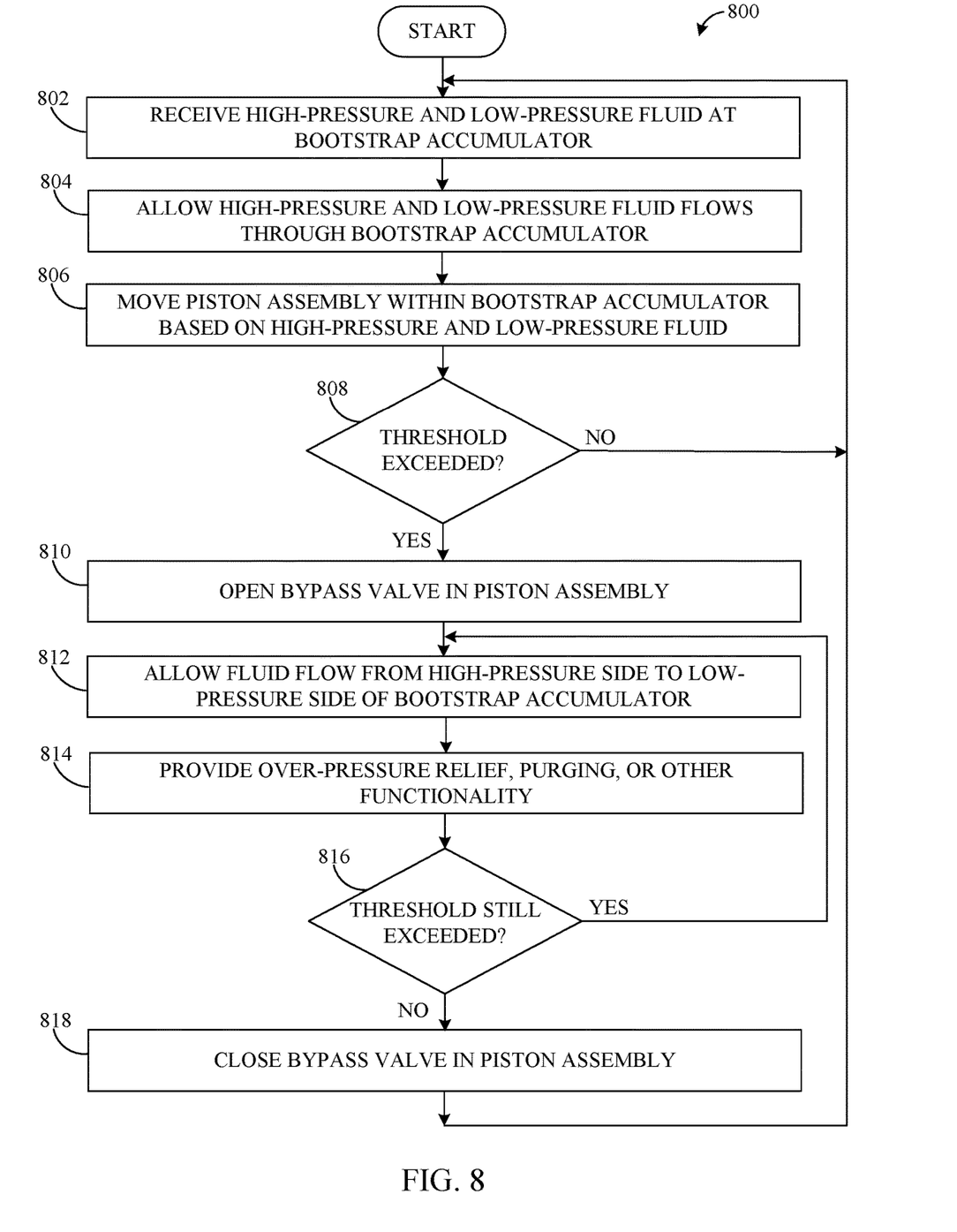
FIG. 8 illustrates an example method for using a bootstrap accumulator containing an integrated bypass valve in accordance with this disclosure.

FIG. 8 illustrates an example method 800 for using a bootstrap accumulator containing an integrated bypass valve in accordance with this disclosure. For ease of explanation, the method 800 is described as involving the use of the bootstrap accumulator 100 of FIGS. 1 through 7. However, the method 800 could involve the use of any other suitable bootstrap accumulator containing an integrated bypass valve.

As shown in FIG. 8, high-pressure and low-pressure fluid is received at a bootstrap accumulator at step 802. This could include, for example, the bootstrap accumulator 100 receiving a high-pressure fluid flow and a low-pressure fluid flow from different sides of a pump 702. The high-pressure and low-pressure fluid is allowed to flow through the bootstrap accumulator at step 804. This could include, for example, the high-pressure fluid passing through the high-pressure connection assembly 104 and the low-pressure fluid passing through the low-pressure connection assembly 112. The high-pressure and low-pressure fluid causes a piston assembly within the bootstrap accumulator to move at step 806. This could include, for example, the piston assembly 116 moving within the body 102 of the bootstrap accumulator 100 depending on the pressure applied to the high-pressure piston 118 and the pressure applied to the low-pressure piston 120. As long as a pressure threshold is not exceeded at step 808, these steps can continue, allowing the bootstrap accumulator 100 to help compensate for temperature-based pressure variations or other variations. The pressure threshold can represent a pressure of the high-pressure fluid or a pressure differential between the high-pressure and low-pressure fluid above which the force exerted by the spring 144 on the ball 142 is overcome, enabling the ball 142 in the bypass valve 140 to move.

If the pressure threshold is exceeded at step 808, a bypass valve in the piston assembly is opened at step 810. This could include, for example, the ball 142 moving against the spring 144 and opening up the fluid pathway 138. This allows a fluid flow to form between the high-pressure and low-pressure sides of the bootstrap accumulator at step 812. This could include, for example, fluid passing through the piston 118, connecting rod 122, and piston 120. This helps to provide over-pressure relief, purging, or other functionality at step 814. This could include, for example, the fluid flow reducing pressure in the high-pressure side of the bootstrap accumulator 100 or purging air from the bootstrap accumulator 100. As long as the pressure threshold remains exceeded at step 816, these steps can continue. Once the pressure threshold is not exceeded at step 816, the bypass valve in the piston assembly is closed at step 818. This could include, for example, the spring 144 pushing the ball 142 to close the fluid pathway 138. The process can then return to step 802.

Although FIG. 8 illustrates one example of a method 800 for using a bootstrap accumulator containing an integrated bypass valve, various changes may be made to FIG. 8. For example, while shown as a series of steps, various steps in FIG. 8 could overlap, occur in parallel, occur in a different order, or occur any number of times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus comprising:
   a bootstrap accumulator comprising:
     multiple fluid expansion volumes each configured to receive fluid;
     a body defining a first fluid expansion volume of the multiple fluid expansion volumes;
     a connection assembly coupled to or integrated with the body, the connection assembly defining a second fluid expansion volume of the multiple fluid expansion volumes;
     a high-pressure fluid connector attached to the connection assembly, in fluid communication with the second fluid expansion volume, and configured to introduce a high-pressure fluid into the second fluid expansion volume;
     a piston assembly configured to move within the fluid expansion volumes based on pressures within the fluid expansion volumes, wherein the piston assembly comprises:
       multiple pistons configured to move within the fluid expansion volumes;
       a connecting rod coupling the pistons;
       a fluid pathway that couples the fluid expansion volumes; and
       a bypass valve configured to selectively open or block the fluid pathway, wherein opening the fluid pathway allows the high-pressure fluid to enter the first fluid expansion volume; and
     a low-pressure fluid connector attached to the body, in fluid communication with the first fluid expansion volume, and configured to:
       introduce a low-pressure fluid into the first fluid expansion volume; and
       release the high-pressure fluid allowed to enter the first fluid expansion volume through the opened fluid pathway.

2. The apparatus of claim 1, wherein:
   the fluid pathway passes through the pistons and the connecting rod; and
   at least part of the bypass valve is located within the connecting rod.

3. The apparatus of claim 2, wherein:
   the fluid pathway comprises a narrower path through a first portion of the connecting rod and a wider path through a second portion of the connecting rod;
   at least part of the bypass valve is located within the wider path through the second portion of the connecting rod; and
   the bypass valve comprises:
     a ball; and
     a spring configured to push the ball to block the narrower path through the first portion of the connecting rod.

4. The apparatus of claim 1, wherein the bypass valve is configured to block the fluid pathway until the high-pressure fluid from the high-pressure fluid connector over-pressurizes the second fluid expansion volume compared to a pressure of the low-pressure fluid from the low-pressure fluid connector.

5. The apparatus of claim 1, wherein the high-pressure fluid connector and the low-pressure fluid connector are configured to couple to one or more fluid lines.

6. The apparatus of claim 1, wherein:
at least part of the piston assembly is positioned in the body; and
the bootstrap accumulator further comprises a gauge configured to identify a location of the piston assembly within the body, the gauge configured to pass through an opening of the body.

7. An apparatus of claim 1, comprising:
a bootstrap accumulator comprising:
multiple fluid expansion volumes each configured to receive fluid;
a body defining a first fluid expansion volume of the multiple fluid expansion volumes;
a connection assembly coupled to or integrated with the body, the connection assembly defining a second fluid expansion volume of the multiple fluid expansion volumes;
a high-pressure fluid connector attached to the connection assembly, in fluid communication with the second fluid expansion volume, and configured to introduce a high-pressure fluid into the second fluid expansion volume;
a piston assembly configured to move within the fluid expansion volumes based on pressures within the fluid expansion volumes, wherein the piston assembly comprises:
a fluid pathway that couples the fluid expansion volumes; and
a bypass valve configured to selectively open or block the fluid pathway, wherein opening the fluid pathway allows the high-pressure fluid to enter the first fluid expansion volume; and
a low-pressure fluid connector attached to the body, in fluid communication with the first fluid expansion volume, and configured to:
introduce a low-pressure fluid into the first fluid expansion volume; and
release the high-pressure fluid allowed to enter the first fluid expansion volume through the opened fluid pathway;
wherein the body comprises a vent opening configured to allow ambient air to enter and exit a space between pistons of the piston assembly.

8. The apparatus of claim 7, wherein the piston assembly further comprises:
multiple pistons configured to move within the fluid expansion volumes; and
a connecting rod coupling the pistons.

9. A system comprising:
a pump configured to be coupled to an input fluid line and an output fluid line, the pump also configured to receive fluid through the input fluid line and to provide the fluid through the output fluid line; and
a bootstrap accumulator configured to be coupled to the input fluid line and the output fluid line, the bootstrap accumulator comprising:
multiple fluid expansion volumes configured to receive the fluid from different ones of the input fluid line and the output fluid line;
a body defining a first fluid expansion volume of the multiple fluid expansion volumes;
a connection assembly coupled to or integrated with the body, the connection assembly defining a second fluid expansion volume of the multiple fluid expansion volumes;
a high-pressure fluid connector attached to the connection assembly, in fluid communication with the second fluid expansion volume, and configured to introduce a high-pressure fluid into the second fluid expansion volume;
a piston assembly configured to move within the fluid expansion volumes based on pressures within the fluid expansion volumes, wherein the piston assembly comprises:
a fluid pathway that couples the fluid expansion volumes; and
a bypass valve configured to selectively open or block the fluid pathway, wherein opening the fluid pathway allows the high-pressure fluid to enter the first fluid expansion volume; and
a low-pressure fluid connector attached to the body, in fluid communication with the first fluid expansion volume, and configured to:
introduce a low-pressure fluid into the first fluid expansion volume; and
release the high-pressure fluid allowed to enter the first fluid expansion volume through the opened fluid pathway;
wherein the body comprises a vent opening configured to allow ambient air to enter and exit a space between pistons of the piston assembly.

10. The system of claim 9, wherein the bypass valve is configured to block the fluid pathway until the high-pressure fluid from the high-pressure fluid connector over-pressurizes the second fluid expansion volume compared to a pressure of the low-pressure fluid from the low-pressure fluid connector.

11. The system of claim 9, wherein:
at least part of the piston assembly is positioned in the body; and
the bootstrap accumulator further comprises a gauge configured to identify a location of the piston assembly within the body, the gauge configured to pass through an opening of the body.

12. The system of claim 9, further comprising:
a heat exchanger configured to remove heat from the fluid; and
a valve configured to selectively direct the fluid towards the bootstrap accumulator or the heat exchanger.

13. A system comprising:
a pump configured to be coupled to an input fluid line and an output fluid line, the pump also configured to receive fluid through the input fluid line and to provide the fluid through the output fluid line; and
a bootstrap accumulator configured to be coupled to the input fluid line and the output fluid line, the bootstrap accumulator comprising:
multiple fluid expansion volumes configured to receive the fluid from different ones of the input fluid line and the output fluid line;
a body defining a first fluid expansion volume of the multiple fluid expansion volumes;
a connection assembly coupled to or integrated with the body, the connection assembly defining a second fluid expansion volume of the multiple fluid expansion volumes;
a high-pressure fluid connector attached to the connection assembly, in fluid communication with the second fluid expansion volume, and configured to introduce a high-pressure fluid into the second fluid expansion volume;

a piston assembly configured to move within the fluid expansion volumes based on pressures within the fluid expansion volumes, wherein the piston assembly comprises:
- multiple pistons configured to move within the fluid expansion volumes;
- a connecting rod coupling the pistons;
- a fluid pathway that couples the fluid expansion volumes; and
- a bypass valve configured to selectively open or block the fluid pathway, wherein opening the fluid pathway allows the high-pressure fluid to enter the first fluid expansion volume; and a low-pressure fluid connector attached to the body, in fluid communication with the first fluid expansion volume, and configured to:
- introduce a low-pressure fluid into the first fluid expansion volume; and
- release the high-pressure fluid allowed to enter the first fluid expansion volume through the opened fluid pathway.

14. The system of claim 13, wherein:
the fluid pathway passes through the pistons and the connecting rod; and
at least part of the bypass valve is located within the connecting rod.

15. The system of claim 14, wherein:
the fluid pathway comprises a narrower path through a first portion of the connecting rod and a wider path through a second portion of the connecting rod;
at least part of the bypass valve is located within the wider path through the second portion of the connecting rod; and
the bypass valve comprises:
- a ball, and
- a spring configured to push the ball to block the narrower path through the first portion of the connecting rod.

16. The system of claim 13, wherein the body comprises a vent opening configured to allow ambient air to enter and exit a space between the pistons of the piston assembly.

17. A method comprising:
receiving fluid in multiple fluid expansion volumes of a bootstrap accumulator, which comprises receiving a low-pressure fluid into a first fluid expansion volume from a low-pressure fluid connector and a high-pressure fluid into a second fluid expansion volume from a high-pressure fluid connector, wherein a body of the bootstrap accumulator defines the first fluid expansion volume and a connection assembly coupled to or integrated with the body defines the second fluid expansion volume;
moving a piston assembly within the fluid expansion volumes based on pressures within the fluid expansion volumes;
allowing ambient air to enter and exit a space between multiple pistons of the piston assembly;
in response to a pressure threshold associated with one or both of the fluid expansion volumes being met, opening a fluid pathway that couples the fluid expansion volumes using a bypass valve in the piston assembly to allow the high-pressure fluid to enter the first fluid expansion volume; and
releasing, using the low-pressure fluid connector, the high-pressure fluid allowed to enter the first fluid expansion volume through the opened fluid pathway.

18. The method of claim 17, wherein:
the pressure threshold is met during a purge; and
the method further comprises removing air in the bootstrap accumulator during the purge.

19. The method of claim 17, wherein:
the pistons are configured to move within the fluid expansion volumes; and
the piston assembly further comprises a connecting rod coupling the pistons.

20. The method of claim 17, wherein at least part of the piston assembly is positioned in the body.

* * * * *

UNITED STATES PATENT AND TRADEMARK OFFICE
CERTIFICATE OF CORRECTION

| | |
|---|---|
| PATENT NO. | : 10,954,966 B2 |
| APPLICATION NO. | : 15/792971 |
| DATED | : March 23, 2021 |
| INVENTOR(S) | : Kirk A. Miller |

It is certified that error appears in the above-identified patent and that said Letters Patent is hereby corrected as shown below:

In the Claims

In Claim 7, Column 13, Line 8, "An apparatus of claim 1, comprising:" should be changed to --An apparatus comprising:--.

Signed and Sealed this
Seventh Day of February, 2023

Katherine Kelly Vidal
*Director of the United States Patent and Trademark Office*